June 11, 1940. R. ALKAN 2,204,290
AUTOMATIC STEERING DEVICE
Filed Aug. 8, 1938 2 Sheets-Sheet 1
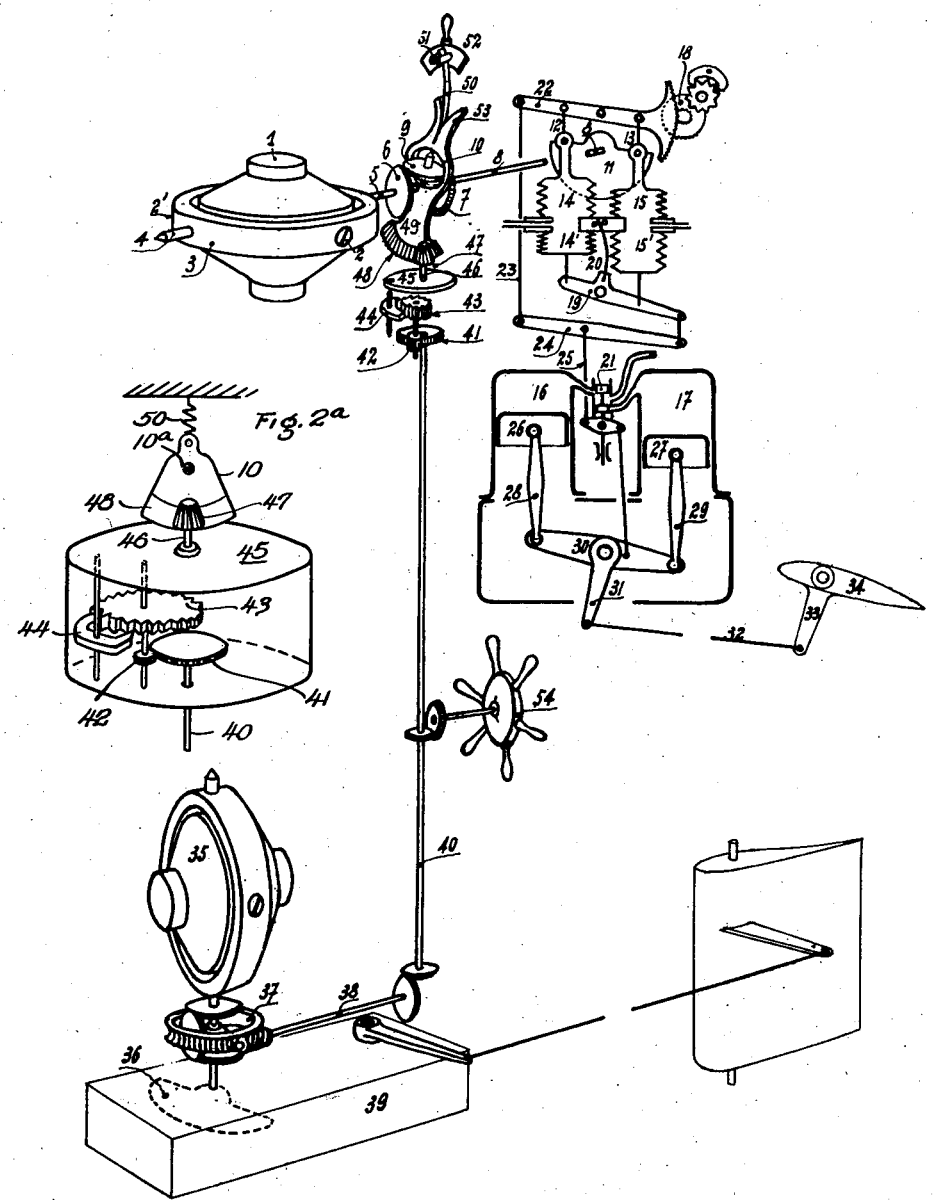

June 11, 1940.   R. ALKAN   2,204,290
AUTOMATIC STEERING DEVICE
Filed Aug. 8, 1938   2 Sheets-Sheet 2
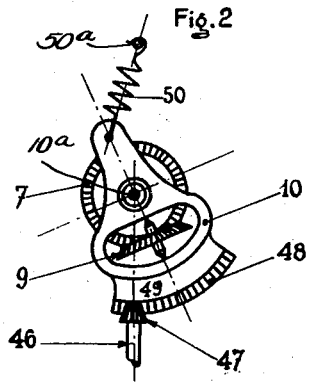
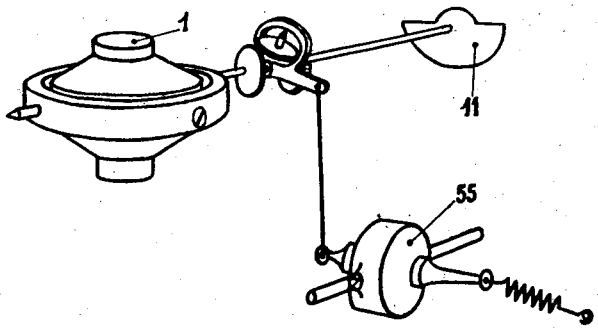
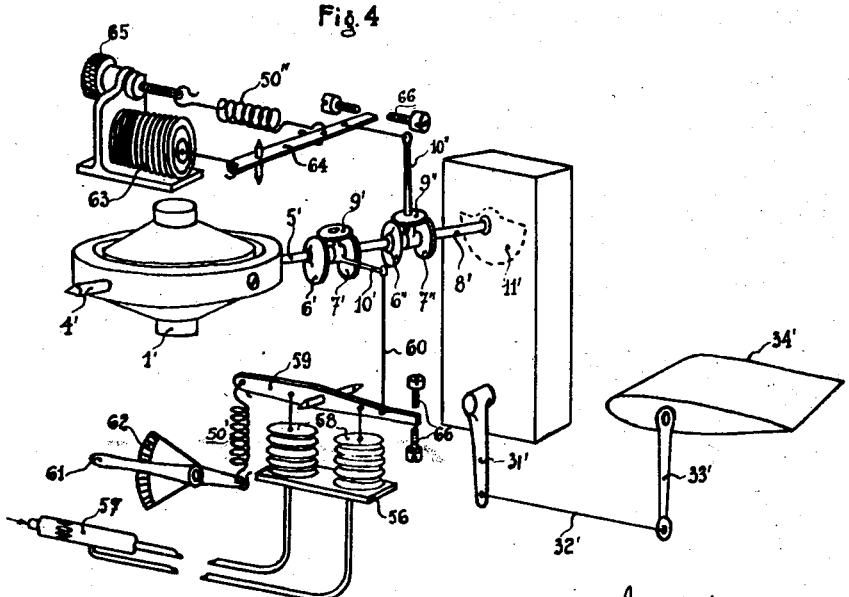
Inventor
Robert Alkan
By Stephen Cerstvik
Attorney Patented June 11, 1940

2,204,290

UNITED STATES PATENT OFFICE 2,204,290

AUTOMATIC STEERING DEVICE

Robert Alkan, Paris, France

Application August 8, 1938, Serial No. 223,776
In France August 12, 1937

17 Claims. (Cl. 244—76)

This invention relates to automatic steering devices for dirigible crafts and is designed particularly for meeting the special problems that arise in the automatic control or piloting of aircrafts.

In the automatic steering devices now in use, it is a common practice to provide the controls from position or direction reference apparatus adapted to give the indication of a fixed reference in space. As example of such apparatus may be cited the gyroscopes which are generally associated with follow-up devices providing the necessary mechanical energy for the operation of the control surfaces. It is also a general practice to adjoin to such fixed reference apparatus certain measuring instruments responsive to various factors which it is desirable to introduce in the control of members or surfaces to be controlled. Generally, such measuring instruments possess but a very small energy and therefore can be used for controlling purposes only in association with follow-up mechanisms, certain of which, such as, for instance described in the applicant's co-pending application No. 161,863, filed August 31, 1937, permit to produce a controlling action, not only dependent upon the amplitude of deviation of a reference apparatus, but also dependent upon the first and the second derivatives of said deviation with respect to the time.

In a general manner, the invention has broadly for its object to improve the precision and the quality of steering attainable hitherto.

With this object in view, one of the features of the present invention consists in the provision of an automatic control arrangement making use of a follow-up device of the above mentioned improved kind and in which said device is made commonly or simultaneously responsive to a reference apparatus and to a measuring instrument adjoined to the same, whereby values proportional to the amount, rate of change and acceleration of the measured force may be applied as a control value.

Another feature of the invention consists in providing an automatic control arrangement in which the indications of a measuring instrument are caused to act on a connecting mechanism inserted between a gyroscopic reference apparatus and the particular follow-up device under consideration, whereby values proportional to the amount, rate of change and second differential of the amount of the measured force may be applied as a control value.

A further feature of the invention consists in providing an automatic steering or control system in which the indications of a measuring instrument such as an indicator of the speed of the aircraft are caused to act on a differential mechanism inserted between the gyroscope controlling the longitudinal stability of the craft and its follow-up device.

A further feature of the invention consists in providing an automatic steering or control system in which the indications of a measuring instrument, such as an indicator of the angular speed of turn of the aircraft, are caused to act on a differential mechanism inserted between the gyroscope controlling the lateral stability of the craft and its follow-up device.

A further feature of the invention consists in providing an automatic steering or control system in which the movements of a member of a course stabilizing mechanism are caused to act on a differential mechanism inserted between the transverse axis stabilizing gyroscope and its follow-up device.

A further feature of the invention consists in providing an automatic steering or control system in which the indications of an instrument measuring the speed of actuation of the change in course control of the craft are caused to act on a differential mechanism inserted between the gyroscope controlling the lateral stabilizing of the craft and its follow-up device.

A further feature of the invention consists in providing an automatic steering or control system in which the indications of an instrument measuring the altitude or altitude changes of the craft are caused to act on a differential mechanism inserted between the gyroscope controlling the longitudinal stability of the craft and its follow-up device.

A further feature of the invention consists in providing an automatic steering or control system in which the indications of a measuring instrument and the variations imposed by a hand control are caused to act simultaneously on one and the same differential mechanism inserted between a stabilizing gyroscope and its follow-up device.

A further feature of the invention consists in providing an automatic steering or control system in which the indications of a plurality of measuring instruments and the intervening action of a plurality of hand controls are caused to act simultaneously on a differential mechanism inserted between a stabilizing gyroscope and its follow-up device.

The above and other objects and features of the invention will appear more clearly from the following detailed description and drawings showing several embodiments of the invention, it being understood that these embodiments are shown by way of example only and that the invention is not limited thereto.

In the drawings:

Figure 1 is a diagrammatic perspective view of an automatic pilot device for directional steering and lateral stabilization embodying the improvements according to the invention;

Figure 2 is a detailed view of a modified embodiment of certain elements as illustrated in Fig. 1;

Figure 2a is a detailed diagrammatic perspective view of certain of the elements illustrated in Fig. 1, as applied to the modification of Fig. 2;

Figure 3 is a perspective view illustrating another embodiment of the device as illustrated in Fig. 1; and Figure 4 is a diagrammatical perspective view of another modification for producing longitudinal stabilization and embodying improvements according to the invention.

According to the invention, for establishing an automatic pilot system, one preferably proceeds in the following or in a similar manner:

A reference apparatus is established which is formed, for instance, of a vertical gyroscope (Figure 1), the spinning rotor of which rotates about a vertical axis in a casing 1, journalled at 2, 2', in a frame 3 which is journalled, in its turn, about a horizontal axis 4, 5 carried by a fixed frame, not shown. The gyroscope thus formed can be stabilized in the very vicinity of the true vertical by any known means but preferably by a mechanism indicated in the applicant's prior application Serial No. 19,241.

On the horizontal shaft 5 is keyed a pinion 6 which forms the primary element of a differential gear mechanism comprising a secondary pinion 7 keyed on the shaft 8 in alignment with shaft 5 and one or more planetary pinions such as 9 journalled in a frame 10 which forms the middle or the planetary element of said differential gear mechanism. This differential gear mechanism is adapted to control a follow-up device such as described in the applicant's copending application No. 161,863 and which comprises a sensitive disc 11 secured on the axis 8 and moving in front of two orifices 12 and 13 carried by two pairs of bellows 14—14' and 15—15' respectively, the bellows 14—15 forming a follow-up device proper providing a control factor proportional to the amplitude of deviations and bellows 14'—15' serving to produce or to materialize the first and second derivatives of the deviations owing to the action of a retarding mechanism 18 and of the pressure measuring device 19—20, as more explicitly described in the above mentioned copending application.

Briefly, the slide valve 21 of the servo-motor 16—17 operating the controlled member is actuated by the linkage assembly 22—23—24—25 in response to the sum of three terms which are, the amplitude of the relative deviation between the control disc 11 and the craft, and the first and second derivatives of this deviation with respect to time.

By arranging the axis 4—5—8, for instance so as to be parallel to the longitudinal axis of an aeroplane, and by connecting pistons 26 and 27 through a linkage assembly 28, 29, 30, 31, 32, 33 to the ailerons such as 34, one provides a transverse or lateral stability control of the aircraft.

Moreover, the craft may be provided with a direction stabilizing system, such as described in the applicant's co-pending applications filed under Nos. 161,863 and 179,029 which system comprises a directional gyroscope 35 actuating, by means of a differential gear 37, the planetary frame of which can be controlled by a worm control shaft 38, a control disc such as 36 and a follow-up control device 39 in all points similar to that previously described in connection with the lateral stability control. In this system, the desired changes of the course are produced by rotating a control shaft 40, the number of revolutions of which determines the extent of the ordered change in course, while the angular speed of turn imposed on the aircraft is made practically proportional to the angular speed of actuation of said control shaft. With a directional steering system of this kind, it is possible to derive from a control shaft such as 40 a speed responsive control to be applied to the planetary frame 10 of the differential gear of the lateral stability control to produce automatically the desired banking of the craft upon turning movements imposed on the craft by actuating the directional steering system. This may be obtained by providing a speed responsive and measuring mechanism 41, 42, 43, 44 (see Fig. 2a) pivotally supported in casing 45 connected by a shaft 46 attached to the casing and a pinion 47 to a toothed sector 48 provided on an extension 49 (see Fig. 1) forming part of the planetary frame 10 which latter is urged towards a central or rest position by a plate spring 50 secured to said planetary frame 10 at one of its ends and retained in a fork 51 carried by an adjustable support 52 at its other end. The speed responsive device may be of any known structure but preferably it will be constituted, as shown in the drawings, by a transmission gear 41, 42, the last element of which is formed by an escapement wheel 43 the movement of which is retardated by a free anchor 44. Upon rotation of the driving shaft 40, the escapement mechanism produces a braking action proportional to the square of the rotational speed of shaft 40 and thereby exerts a torque on the supporting casing 45 tending to drive the casing with the shaft 40. However, the spring restrained sector 48 applies a counter-torque so that casing 45 is rotated an amount proportional to the speed of rotation of shaft 40. The deflection of sector 48 and therefore of the differential gear mechanism between the horizon 1 and the aileron servo-motor, is thereby made proportional to the speed of actuation of the manually operated course-change control means 54 or the speed of rotation of shaft 40. In comparison to the instruments which are commonly used, this form of embodiment offers the advantage of producing on the casing 45, a comparatively high torque for rather low angular speeds of the shaft 40.

It is easy to see that during the time of a turn resulting from a course change, imposed either by the hand control 54 or by an auxiliary mechanism, the transverse stability control of the aeroplane, instead of being effected solely with respect to an horizontal plane, maintained by the gyroscope 1, will also be effected with respect to an inclined direction resulting simultaneously from the reference plane given by the gyroscope 1 and from the angle of rotation imposed on the planetary frame 10 by the shaft 46 actuated by the speed responsive device 41, 42, 43, 44. It is clear that by suitably choosing the direction of rotation and the gear ratio for amplifying the movements, it is possible to cause the aeroplane to bank by the exact angle necessary for insuring a correct turning without slipping or gliding. By the utilization of such a speed measuring device, a control effect is applied to the shaft 8 proportional to the measurement and in addition, by the coaction of the follow-up means 14, 14', 15, 15', 19, 24, 23, 22, and 18, a control effect is applied to the servo-motor proportional to the amount, the rate of change and the second differential of the value of said measurement.

Since generally angular speed measuring devices, and in particular the above mentioned device, do not have a linear characteristic, but on the contrary a curved characteristic which is usually a parabolic one, it is advantageous to provide a compensation for the curvature of this characteristic by a very simple means which consists in guiding the return spring 50 in the neighbourhood of its securing point to the planetary frame 10 by a pair of cam surfaces 53 which cause an increase of the stiffness of the spring 50 as a function of the elongation of the same. With this compensation effected, the angle by which the middle element 10 of the differential gear rotates is made proportional to the speed of rotation of the shaft 40.

Instead of compensating only for the curvature of the characteristic of the speed measuring device, it is possible, by slightly modifying the contour of the double cam 53 to give to this characteristic any desired form. For instance, when it is desired to make a turn while maintaining the speed of the craft practically constant, the characteristic may be given such a form that instead of retaining a linear relation between the speed of rotation of control shaft 40 and the angle of deflection of the planetary frame 10, there is established a linear relation between the tangent of said angle of deflection of the planetary frame 10 and the speed of rotation of the shaft 40. In fact, in this case, the angle of bank which it is desired to impose on the airplane is expressed by:

$$\tan \alpha = \frac{\omega^2 r}{g} = \frac{\omega V}{g}$$

$\omega$ being the angular speed of deviation or turn of the airplane, $r$ the radius of turn, $g$ the acceleration of gravity and $V$ the speed of the airplane on its trajectory to be maintained constant, which expression shows that the airplane must be banked by an angle the tangent of which is proportional to the speed of turn, which is precisely the result obtained with the mechanism described above since with such a mechanism, the angular speed of turn is, as previously explained, determined by the speed of rotation imposed on the control wheel 54 and hence on the shaft 40 and the planetary frame 10 is rotated in response to the speed of rotation of said shaft 40 by an angle, the tangent of which is proportional to the speed of rotation of said shaft.

By adjusting the support 52 in the plane of the element 10 and concentrically to the axis 4—8 it is possible to vary the neutral position of the disc 11 with respect to the horizon base reference furnished by gyro 1, without necessitating the intervention of a complementary differential gear on the axis 5—8 for this purpose.

The same result, as obtained with the above explained arrangement, namely, utilizing a flat spring 50 and double cam surface 53, may be obtained with a mechanism such as shown in Fig. 2, utilizing a helical spring. As shown in this arrangement, the helical spring is pivotally anchored at one end at a fixed point 50a, which may be located as in the device of Fig. 1, in an adjustable support, while the other end is attached to the upper extremity of the planetary frame 10. It is apparent that with this arrangement, the restraining torque applied to the planetary frame upon deflection varies on one hand with the deflection of the spring along its axis and on the other hand with the length of the lever arm between the direction of said axis and the axis of rotation 10a of said planetary frame. With these two variable factors controlling the restraining or return torque acting on the planetary frame 10, it is possible to give any desired form to the curve expressing the relationship between the angular deflection of the planetary frame 10 and the speed of rotation of the control shaft 40 or of shaft 46, and in particular, such a form that the angular deviations of said planetary frame would control the banking of the airplane according to any desired law.

Thus, with an automatic steering device improved according to the invention, it is possible automatically to perform correct turns with a banking angle controlled without any reference to gravity controlled means indicating the apparent vertical, which offers a great advantage in the case of flights in a bad weather when the indicators for this apparent vertical are often strongly perturbated.

Instead of using the indications of a speed measuring or responsive device connected with the course control shaft, for instance, in the case when this control does not exist, it is possible to control the position of the planetary member 10 of the differential gear by the indications of a rate of turn indicator 55 (Figure 3) comprising a gyroscope with two degrees of freedom the deviations of which are independent of the lateral inclination of the airplane but are a function of the angular speed of turn in the horizontal plane.

For providing the longitudinal stabilizing control, reference is made to Fig. 4 wherein the horizontal axis 4', 5', 8', of a vertical gyroscope 1' similar to that of Fig. 1 is set perpendicularly to the longitudinal axis of the airplane and a follow-up control system similar to that of Fig. 1 is caused to operate the control of the horizontal rudder or elevator. The instantaneous impulses given by the vertical gyroscope 1' can be then completed by subjecting the middle or planetary part 10' of the differential gear to the control of an instrument measuring the airspeed of the airplane, such as a differential manometer 56 formed of two manometer capsules 58 connected to a Pitot tube 57 or to a venturi placed in the relative air stream. The capsules are connected through links to an oscillating lever 59 adapted to control the planetary part 10' of the differential gear by means of a rod 60. A return spring 50' urges the lever to its middle position and determines the sensitivity of the manometric device.

With the arrangement just described the pitch of the airplane controlled by elevator 34' can be manually adjusted by acting on the tension of the return spring 50' of the manometer assembly 56 for which purpose this spring is anchored at the extremity of manually adjustable lever 61 movable over a stop limb 62, whereby it can be held stationary in any selected position. Thus, the pitch of the craft becomes a function of the differential pressure acting on the manometer assembly 56 and the angular position of the lever 61.

In other words, with this arrangement, both the manual and the airspeed responsive controls of the pitch are combined by the single lever 59 and are introduced into the control of the elevator through a common differential gear mechanism 6', 7', 9', and 10' which avoids the necessity of providing a separate hand control requiring the presence of a separate differential gear assembly in the driving connection between the horizon gyroscope and the control disc 11' of the elevator servo-motor.

In order to introduce in the control of the longitudinal stabilization a factor depending on the variations of altitude, which has for its effect, not only to attenuate the variations of the inclination, but also to maintain the horizontality of the mean trajectory, it is possible to establish on the axis 5', 8' a complementary differential gear 6'', 7'', 9'', 10'', the middle part 10'' of which will be controlled by an altimetric capsule 63 which can be caused to operate like the capsule of an altimeter or like the capsule of a statoscope or climb indicator. The movements of the capsule 63 will be amplified by means of a lever 64 urged by a return spring 50'' the tension of which will be adjusted by means of a knurled knob 65 or a similar adjusting member.

Thus there will be provided a stabilizing mechanism for the longitudinal axis in which four variables are caused to exert their action on the stabilizing mechanism, i. e., the airspeed given by the manometer assembly 56, the hand control 61, the altitude control produced by the capsule 63 and finally a further hand control 65 permitting to adjust the value of the altitude to be maintained.

In order to prevent any exaggerated deflection of any of these devices to be applied to the control, the movements of the middle elements 10', 10'' of the differential gears are preferably limited by means of adjustable stops 66.

It will be noted that, in all the cases under consideration, the measuring instruments have to develop small forces only, since their control factors are introduced into the control mechanism between the gyroscope and the control elements, such as discs 11 or 11' and, therefore, they can be so made as to have very small dimensions and weights and take advantage, without any complementary complication, of the follow-up relation which is common to them and the vertical gyroscope.

Although certain specific embodiments of the invention have been shown for purposes of illustration, it is to be expressly understood that various changes and modifications may be made therein as will appear to a person skilled in the art. Reference is therefore to be had to the appended claims for a definition of the limits of the invention.

What is claimed is:

1. In an automatic pilot for aircraft, the combination with a directional base line, a servo-motor and a rudder, of control elements actuated by said base line and servo-motor, respectively, the relative position of which governs the servo-motor, means for shifting the relative position of said elements whereby a turn is caused, and means responsive to the speed of shifting of the relative position of said elements for causing automatic banking of the craft during a turn at the correct banking angle.

2. In an automatic pilot for aircraft, the combination with directional and horizon gyroscopes, servo-motors, a rudder and ailerons, of control elements actuated by each gyroscope and their respective servo-motors, respectively, means operable at will for shifting the relative position of said directional control elements to cause turning of the craft, and means responsive to the speed of shifting of the relative position of said directional control elements for altering the relative position of the horizon elements to control the ailerons whereby a proper banking of the craft is obtained at an angle proportional to the rate of turn.

3. In an automatic pilot for aircraft, the combination with directional and horizon gyroscopes, steering and banking servo-motors, a rudder, and ailerons, of control elements actuated by each gyroscope and their respective servo-motors for governing the steering and banking servo-motors, means for altering the relative position of the horizon control elements to cause banking, means for shifting the relative position of said directional control elements, whereby turning is caused, means for measuring the speed of shifting of the relative position of said directional elements, and means controlled thereby for altering the relative position of said horizon elements to control the ailerons to cause banking at the proper angle during turn.

4. An automatic control system for a dirigible craft, comprising a control surface for controlling said craft with respect to a desired axis, means responsive to the deviation of said craft about said axis, differential gear means connecting said responsive means to said surface for controlling said surface, and manual control means for adjusting an element of said differential gear mechanism including means for measuring the speed of operation of said manual control means and applying an effect to said element proportional to said speed.

5. An automatic control system for a dirigible craft comprising a control surface for controlling said craft with respect to a desired axis, means comprising a gyro horizon responsive to the deviation of said craft about said axis, means comprising a rotatable member for operating said control service, differential gear means connecting said responsive means to said rotatable member for operating said surface during deviation of said shaft about said axis, and means including means measuring the speed of said craft for automatically adjusting an element of said differential gear mechanism modifying the rotation of said rotatable member in proportion to the speed of said craft.

6. An automatic control system for a dirigible craft comprising a control surface for controlling said craft with respect to a desired axis, means responsive to the deviation of said craft about said axis, means connecting said responsive means to said surface for controlling said surface, means responsive to the speed of said craft for applying to said surface an effect proportional to said speed, and means deriving an effect proportional to the first and second differentials of said speed for controlling said surface.

7. An automatic control system for a dirigible craft comprising a control surface for controlling said craft with respect to a desired axis, means responsive to the deviation of said craft about said axis, means connecting said responsive means to said surface for controlling said surface, means responsive to the speed of said craft for applying to said surface an effect proportional to said speed, and means deriving an effect proportional to the second differential of said speed for controlling said surface.

8. An automatic control system for a dirigible craft comprising a control surface for controlling said craft with respect to a desired axis, means responsive to the deviation of said craft about said axis, means connecting said responsive means to said surface for controlling said surface, altitude responsive means for applying to said surface an effect proportional to the altitude, and means deriving an effect proportional to the first and second differentials of changes in altitude for controlling said surface.

9. An automatic control system for a dirigible craft comprising a control surface for controlling said craft with respect to a desired axis, means responsive to the deviation of said craft about said axis, means connecting said responsive means to said surface for controlling said surface, altitude responsive means for applying to said surface an effect proportional to the altitude, and means deriving an effect proportional to the first differential of altitude changes for controlling said surface.

10. An automatic control system for a dirigible craft comprising a control surface for controlling said craft with respect to a desired axis, means responsive to the deviation of said craft about said axis, means connecting said responsive means to said surface for controlling said surface, altitude responsive means for applying to said surface an effect proportional to the altitude, and means deriving an effect proportional to the second differential of altitude changes for controlling said surface.

11. An automatic control system for a dirigible craft comprising a control surface for controlling said craft with respect to a desired axis, means responsive to the deviation of said craft about said axis, means connecting said responsive means to said surface for controlling said surface, means responsive to the deviation of said craft about a second axis at right angles to said first axis, control means regulated by said responsive means for controlling said craft about said second axis, means for adjusting said control means, and means responsive to the rate of regulation of said control means for varying the control of said first responsive means.

12. An automatic control system for a dirigible craft comprising a directional base line, a servo-motor and a rudder, control elements actuated by said base line and servo-motor, respectively, means for relatively adjusting the position of said elements, means controlled by said elements for producing an effect proportional to said relative adjustment to apply a turn control to said craft proportional to said effect, and means producing an effect proportional to the first differential of said effect for varying said turn control.

13. An automatic control system for a dirigible craft comprising a directional base line, a servo-motor and a rudder therefor, an horizon gyroscope, a servo-motor and a control surface therefor, control elements actuated by said directional base line and its servo-motor, respectively, means for relatively adjusting the positions of said control elements, means producing an effect proportional to said adjustment and to the first and second differentials thereof, and means applying said effect to said control surface.

14. An automatic control system for a dirigible craft, comprising a directional base line, a servo-motor and a rudder therefor, an horizon gyroscope, a servo-motor and a control surface therefor, control elements actuated by said directional base line and its servo-motor, respectively, means for relatively adjusting the positions of said control elements, means producing an effect proportional to said adjustment and to the first differential thereof, and means applying said effect to said control surface.

15. An automatic control system for a dirigible craft comprising a directional base line, a servo-motor and a rudder therefor, an horizon gyroscope, a servo-motor and a control surface therefor, control elements actuated by said directional base line and its servo-motor, respectively, means for relatively adjusting the positions of said control elements, means producing an effect proportional to said adjustment and the second differential thereof, and means applying said effect to said control surface.

16. An automatic control system for a dirigible craft, comprising a control surface for controlling said craft with respect to a desired axis, means responsive to the deviation of said craft about said axis, differential gear means connected to said responsive means, a second differential means connected to said first differential means and to said surface, means responsive to altitude connected to an element of one of said differential gear means, and means responsive to the speed of said craft connected to an element of the other of said differential gear means.

17. An automatic control system for a dirigible craft comprising a servo-motor, a control surface controlled by said servo-motor, a differential gear means, altitude responsive means connected to said differential gear means, a second differential gear means connected to said first gear means, means responsive to the speed of said craft connected to said second gear means, and means connecting one of said gear means to said servo-motor.

ROBERT ALKAN.